United States Patent
Werson et al.

(10) Patent No.: US 6,867,513 B1
(45) Date of Patent: Mar. 15, 2005

(54) ELECTRIC MOTOR

(75) Inventors: Michael John Werson, Eastleigh (GB); Brian Cleaver, Tamworth (GB)

(73) Assignee: Automotive Motion Technology Limited, Andover (GB)

(*) Notice: Subject to any disclaimer, the term of this patent is extended or adjusted under 35 U.S.C. 154(b) by 0 days.

(21) Appl. No.: 10/671,380

(22) Filed: Sep. 25, 2003

(30) Foreign Application Priority Data

Sep. 27, 2002 (GB) .............................................. 0222440

(51) Int. Cl.⁷ .............................................. H02K 15/02
(52) U.S. Cl. ............................ 310/42; 310/261; 29/598
(58) Field of Search ...................... 310/156.08, 156.09, 310/156.12, 156.14, 261, 264, 266–268, 42, 43; 264/249; 474/902–903; 403/247, 256; 411/163; 29/598

(56) References Cited

U.S. PATENT DOCUMENTS

| | | | | |
|---|---|---|---|---|
| 2,756,495 A | * | 7/1956 | Lathrop | 29/450 |
| 3,727,302 A | | 4/1973 | Phelon | 29/596 |
| 4,012,651 A | | 3/1977 | Burson | 310/153 |
| 4,088,914 A | * | 5/1978 | Aoki | 310/264 |
| 4,182,027 A | | 1/1980 | Benezech | 29/598 |
| 4,315,343 A | * | 2/1982 | Neroda et al. | 15/339 |
| 4,318,017 A | * | 3/1982 | Migeon et al. | 310/42 |
| 4,340,560 A | * | 7/1982 | Migeon | 264/249 |
| 4,429,245 A | * | 1/1984 | Muller et al. | 310/261 |
| 4,479,915 A | * | 10/1984 | Tsubouchi et al. | 264/249 |
| 4,623,812 A | * | 11/1986 | van de Griend | 310/268 |
| 4,682,065 A | * | 7/1987 | English et al. | 310/90 |
| 5,620,290 A | * | 4/1997 | Homfeldt et al. | 411/533 |
| 5,758,678 A | * | 6/1998 | Wu | 135/33.41 |
| 5,844,338 A | * | 12/1998 | Horski | 310/90 |

FOREIGN PATENT DOCUMENTS

| | | | | |
|---|---|---|---|---|
| FR | 2 734 958 A | 12/1996 | | H02F/1/17 |
| GB | 2347551 | 9/2000 | | G11B/17/02 |
| JP | 61106038 | 5/1986 | | H02K/5/16 |
| JP | 2-60442 | 2/1990 | | H02K/15/02 |
| JP | 02060442 | 2/1990 | | H02K/15/02 |
| JP | 06038489 | 2/1994 | | H02K/37/12 |

OTHER PUBLICATIONS

European Search Report of Jul. 27, 2004 issued in connection with corresponding European application.

* cited by examiner

Primary Examiner—Burton Mullins
(74) Attorney, Agent, or Firm—Dykema Gossett PLLC

(57) ABSTRACT

An electric motor including a rotor mounted on a motor shaft for rotation around a stator, the rotor including a generally cylindrical wall and a rotor top generally closing the cylinder of the rotor wall, the rotor being connected to the motor shaft by a connecting device, the connecting device being received within an opening in the rotor top and having an aperture for receiving the motor shaft as an interference fit which prevents of rotation of the shaft with respect to the connecting device, the connecting device including a first radially outwardly extending formation at a first side of the rotor top, and a second radially outwardly extending formation at a second side of the rotor top such that the rotor top is received between the first and second radially outwardly extending formations, and there being a spacer between the first radially outwardly extending formation and the first side of the rotor top, the spacer including teeth which dig into the first side of the rotor top and the first radially outwardly extending formation to prevent of rotation of the connecting device with respect to the rotor.

12 Claims, 2 Drawing Sheets

ELECTRIC MOTOR

This application claims priority to United Kingdom Patent Application No. 0222440.0 filed Sep. 7, 2002, the entire disclosure of which is incorporated herein by reference.

FIELD OF THE INVENTION

The present invention relates to an electric motor.

DESCRIPTION OF THE PRIOR ART

In an electric motor where a rotor is mounted outside a stator for rotation around the stator, the rotor typically includes a generally cylindrical rotor wall, and a plurality of permanent magnets or other magnetic field producing elements mounted on an inside surface of the rotor wall. The cylinder of the rotor wall is closed at one end by a top which provides a mounting for a central rotor shaft, the motor shaft being mounted for rotation within the stator, about its longitudinal axis.

It is known to mount the rotor top on the motor shaft by means of a bush formed from the rotor top, the shaft engaging with the bush as an interference fit. In order to provide such a connection, however, the rotor top must be sufficiently thick to provide enough material to form such a bush. As the rotor top and rotor wall are typically formed from a single sheet of metal, the sheet needs to be of a thickness such that there is sufficient material to form the bush on the rotor top. Such a thick sheet metal provides a substantial contribution to the weight of the rotor, and is overly thick in comparison to the minimum thickness needed for the rotor wall to provide support for the magnets.

It is also known to weld the shaft onto the rotor top, but this is time-consuming and is inconvenient.

SUMMARY OF THE INVENTION

According to a first aspect of the invention we provide an electric motor including a rotor mounted on a motor shaft for rotation around a stator, the rotor including a generally cylindrical wall and a rotor top generally closing the cylinder of the rotor wall, the rotor being connected to the motor shaft by a connecting device, the connecting device being received within an opening in the rotor top and having an aperture for receiving the motor shaft as an interference fit which prevents of rotation of the shaft with respect to the connecting device, the connecting device including a first radially outwardly extending formation at a first side of the rotor top, and a second radially outwardly extending formation at a second side of the rotor top such that the rotor top is received between the first and second radially outwardly extending formations, and there being a spacer between the first radially outwardly extending formation and the first side of the rotor top, the spacer including teeth which dig into the first side of the rotor top and the first radially outwardly extending formation to prevent of rotation of the connecting device with respect to the rotor.

Thus, by virtue of the invention, a rotor top is connected to a motor shaft without the need for welding or forming a bush from the rotor top.

The motor shaft and walls of the aperture in the connecting device are preferably splined in order to provide an enhanced interference fit.

The connecting device may include a generally cylindrical body portion through which the aperture is provided, which body portion extends through the opening provided in the rotor top. In this case, the first radially outwardly extending formation may extend from a first end of the body portion, and the second outwardly extending formation may extend from a second end of the body portion.

The spacer is preferably an annular member such as a washer, which is located around the body portion of the connecting device.

According to a second aspect of the invention we provide a method of assembling an electric motor, the electric motor including a rotor having a generally cylindrical rotor wall and a rotor top generally closing the cylinder of the rotor wall, the rotor being mounted on a motor shaft for rotation about a stator, the motor further including a connecting device adapted for connecting the rotor top to the motor shaft, the method including the step of mechanically deforming a portion of the connecting device so as to form a first radially outwardly extending formation, such that the rotor top is clamped between the first radially outwardly extending formation and a second radially outwardly extending formation of the connecting device and movement of the rotor with respect to the connecting device is substantially prevented.

Thus, by virtue of the invention, the need for forming a bush from the rotor or for welding a bush onto the rotor is avoided.

Preferably, the method further includes the step of inserting the motor shaft into an aperture provided in the connecting device such that the shaft engages with the connection device as an interference fit and rotational movement of the motor shaft with respect to the connecting device is substantially prevented.

DESCRIPTION OF THE DRAWINGS

The invention will now be described with reference to the accompanying drawings, of which.

DESCRIPTION OF THE PREFERRED EMBODIMENTS OF THE INVENTION

Figure 1:
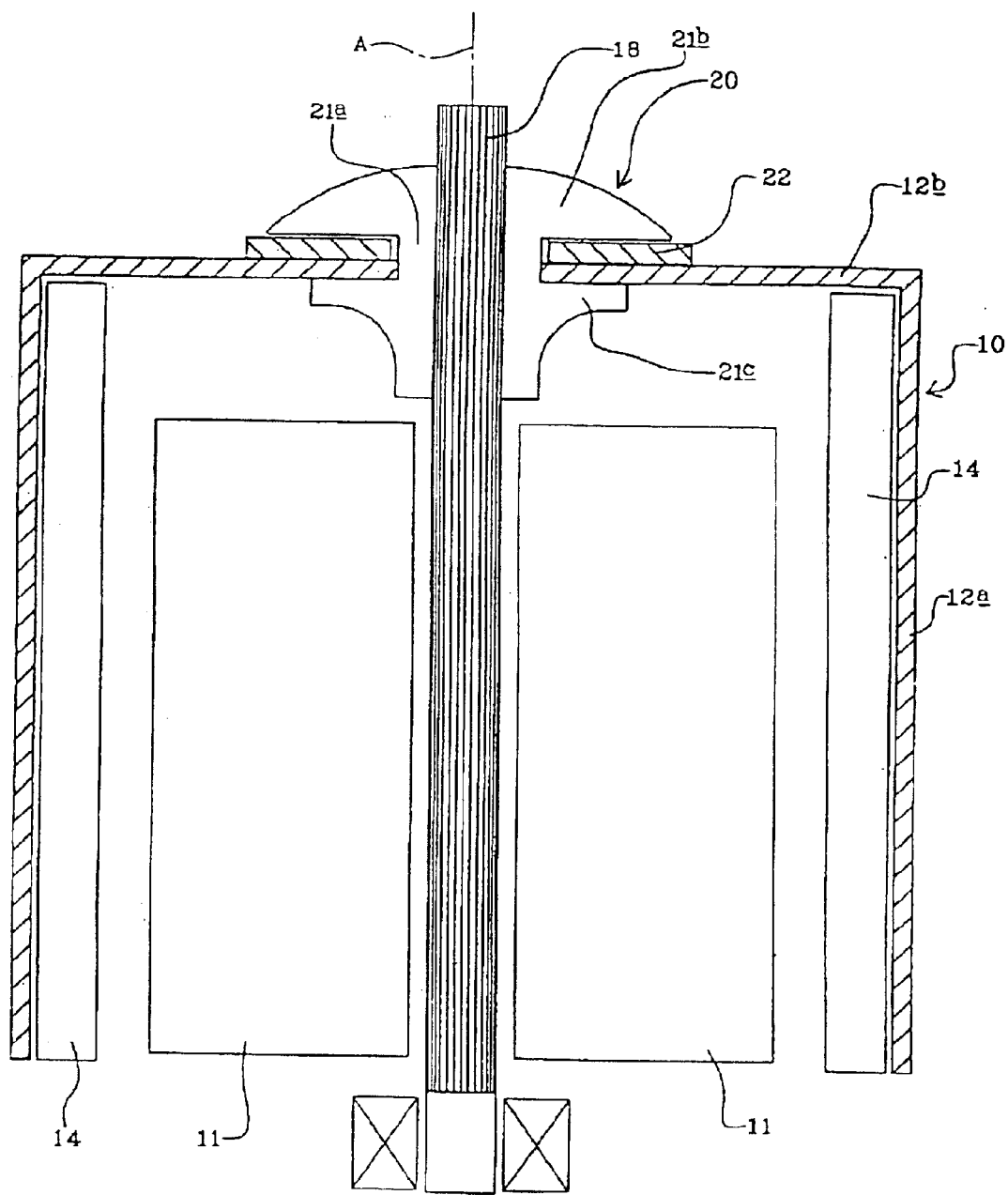
FIG. 1 is an illustration of an electric motor according to the first aspect of the invention.

Referring now to FIG. 1, there is shown an electric motor including a rotor 10 and a stator 11, the rotor 10 being adapted in use to rotate around the stator 11. The rotor 10 includes a generally cylindrical rotor wall 12a, and a rotor top 12b which closes the cylinder of the rotor wall 12a. A plurality of magnetic field producing elements, in this case permanent magnets 14, are mounted around an inside surface of the rotor wall 12a.

The rotor 10 is mounted on a motor shaft 18 which extends though a generally central circular opening provided in the rotor top 12b axially of the rotor wall 12a. The shaft 18 is mounted for rotation about its longitudinal axis A.

The shaft 18 is connected to the rotor top 12b by means of a connecting device 20, which includes a generally cylindrical body portion 18a and has an aperture extending axially through the body portion 18a. A portion of the motor shaft 18 extends through the aperture in the body portion 18a, and is retained therein as an interference fit. To improve the interference fit and to reduce the possibility of the shaft 18 rotating in the aperture, both the shaft 18 and inside walls of the aperture are splined.

The connecting device 20 further includes a first and a second radially outwardly extending formation 21b, 21c, which extend radially outwardly from a first and second end of the body portion 18a respectively. The body portion 21a is received in the opening provided in the rotor top 12b, and the first radially outwardly extending formation 21b is adjacent to a first side of the rotor top 12a, and the second radially outwardly extending formation 21c is adjacent to the second side of the rotor top 12a.

A spacer 22, in this example an annular member such as a washer 22, is arranged around the body portion 21a of the connecting device 20 between the first side of the rotor top 12a and the first outwardly extending formation 21b. The first outwardly extending formation 21b bears on the washer 22 to clamp the rotor top 12b between the washer 22 and the second outwardly extending formation 21c, substantially to prevent movement of the connecting device 20 with respect to the rotor 10.

Figure 2:
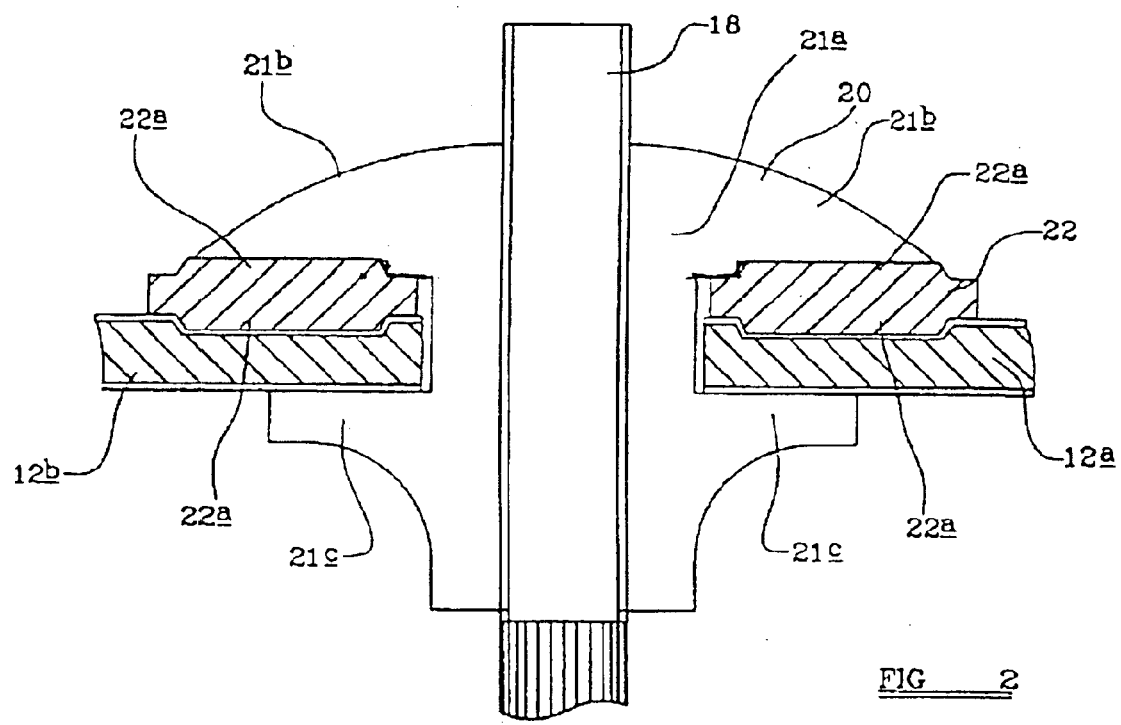
FIG. 2 is an illustration of a longitudinal section through part of the electric motor of FIG. 1.
Figure 3:
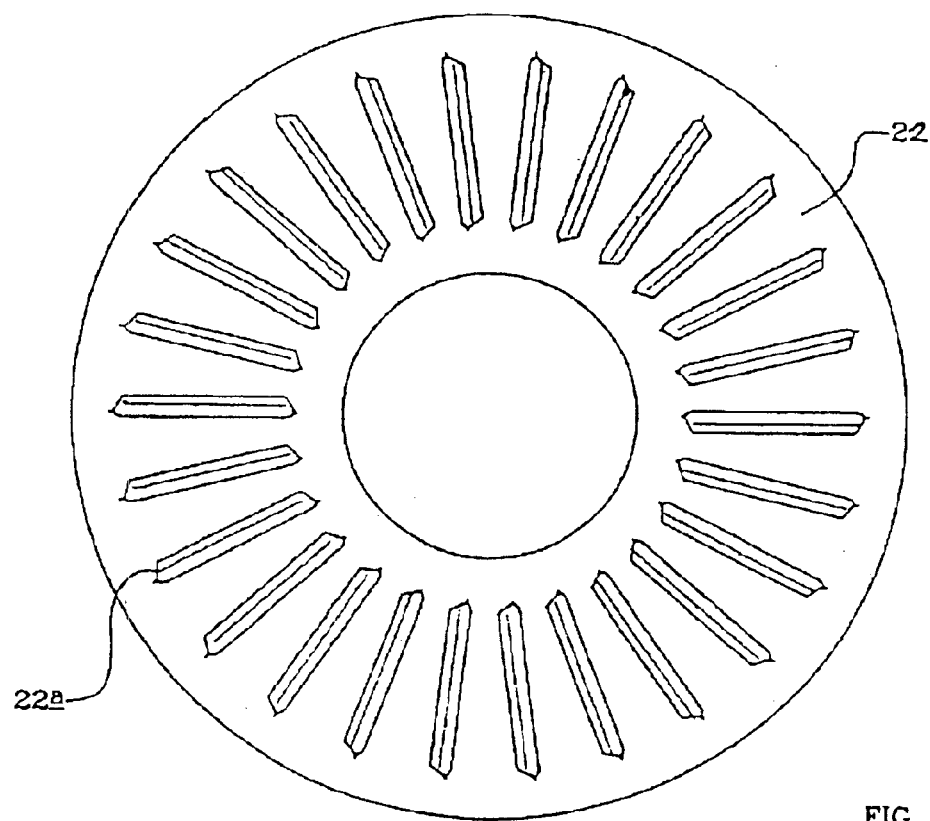
FIG. 3 is an illustration of the spacer of FIG. 2.

In order to minimise the possibility that the connecting device 20 may be able to rotate with respect to the rotor top 12, the washer 22 is provided with a plurality of teeth 22a on its upper and lower surfaces, as shown in FIGS. 2 and 3. In this example, the teeth 22a are ridges which extend radially of the washer 22, but the teeth 22a may instead include radial rows of discrete spikes, for example.

It should be noted that the size of the teeth 22a relative to the remainder of the motor has been significantly exaggerated for clarity. The teeth 22a may, for example, be only of the order of a few microns high.

Teeth 22a on the upper surface of the washer 22 dig into the first radially outwardly extending formation 21b of the connecting device 20, and teeth 22a on the lower surface of the washer 22 dig into the first side of the rotor top 12b. Thus the teeth 22a enhance mechanical locking between the washer 22 and the rotor top 12a and the connecting device 22.

By virtue of the radial arrangement of the teeth 22a, the teeth 22a may prevent, or at least substantially prevent the washer 22 from rotating about axis A with respect to the rotor 10 or the connecting device 20.

The rotor 10 is connected to the shaft 18 as follows.

The connecting device 20 is supplied with the material which will make up the first radially outwardly extending formation 21b forming a continuation of the cylindrical body portion 21a. The cylindrical body portion 21a is inserted through the opening in the rotor top 12b such that the second radially outwardly formation 21c is enclosed by the rotor wall 12a and engages with the second side of the rotor top 12b. The washer 22 is then inserted over the first lip 21b and placed around the body portion 21a of the connecting device 20.

The shaft 18 is inserted into the shaft retaining portion 21a either before the connecting device 20 is fitted through the aperture in the rotor top 12b, or before or after the washer 22 is placed around the body portion 21a.

The connecting device 20 is then mechanically deformed to form the first radially outwardly extending formation 21b and to ensure that the first radially outwardly extending formation 21b engages with an upper surface of the washer 22 and clamp the rotor top 21b between the washer 22 and the second radially outwardly extending formation 21c. This may be achieved by peening or some other form of forging.

As the first radially outwardly extending formation 21b engages with the upper surface of the washer 22, at least some of the teeth 22a provided on the upper surface of the washer 22 dig into the first radially outwardly extending formation 21b. Similarly, as the washer 22 is forced down onto the first side of the rotor top 12b, at least some of the teeth 22a provided on the lower surface of the washer 22 dig into the first side of the rotor top 12b. Thus, movement of the shaft 18 with respect to the rotor 10 is substantially prevented, without the need for welding or forming a bush from a thick-walled rotor top 12b.

In order to reduce the noise generated by the motor it is possible to make the rotor wall 12a and/or top 12b from a layered material comprising two sheets of metal or other rigid material separated by a layer of visco-elastic material. An example of such a material is sold commercially under the trade mark BONDAL®.

Alternatively, or additionally, it is possible to make the washer 22 from such a layered material, and this has been found to assist in damping vibration of the rotor 12, particularly when the motor is operating at high speed.

What is claimed is:

1. An electric motor including a rotor mounted on a motor shaft for rotation around a stator, the rotor including a generally cylindrical wall and a rotor top generally closing the cylinder of the rotor wall, the rotor being connected to the motor shaft by a connecting device, the connecting device being received within an opening in the rotor top and having an aperture for receiving the motor shaft as an interference fit which prevents of rotation of the shaft with respect to the connecting device, the connecting device including a first radially outwardly extending formation at a first side of the rotor top, and a second radially outwardly extending formation at a second side of the rotor top such that the rotor top is received between the first and second radially outwardly extending formations, and there being a spacer between the first radially outwardly extending formation and the first side of the rotor top, the spacer including teeth which dig into the first side of the rotor top and the first radially outwardly extending formation to prevent of rotation of the connecting device with respect to the rotor.

2. A motor according to claim 1 wherein the motor shaft and walls of the aperture in the connecting device are splined.

3. A motor according to claim 2 wherein the connecting device includes a generally cylindrical body portion through which the aperture is provided, which extends through the opening provided in the rotor top.

4. A motor according to claim 3 wherein the first radially outwardly extending formation extends from a first end of the body portion, and the second outwardly extending formation extends from a second end of the body portion.

5. A motor according to claim 4 wherein the spacer is an annular member, which is located around the body portion of the connecting device.

6. A motor according to claim 3 wherein the spacer is an annular member, which is located around the body portion of the connecting device.

7. A motor according to claim 1 wherein the connecting device includes a generally cylindrical body portion through which the aperture is provided, which extends through the opening provided in the rotor top.

8. A motor according to claim 7 wherein the first radially outwardly extending formation extends from a first end of the body portion, and the second outwardly extending formation extends from a second end of the body portion.

9. A motor according to claim 8 wherein the spacer is an annular member, which is located around the body portion of the connecting device.

10. A motor according to claim 7 wherein the spacer is an annular member, which is located around the body portion of the connecting device.

11. A method of assembling an electric motor, the electric motor including a rotor having a generally cylindrical rotor wall and a rotor top generally closing the cylinder of the rotor wall, the rotor being mounted on a motor shaft for rotation about a stator, the motor further including a connecting device adapted for connecting the rotor top to the motor shaft, the connecting device having a first radially outwardly extending formation, the method including the step of mechanically deforming a portion of the connecting device so as to form a second radially outwardly extending formation, such that the rotor top is clamped between the first radially outwardly extending formation and the second radially outwardly extending formation of the connecting device and movement of the rotor with respect to the connecting device is substantially prevented, wherein the method further includes the step of placing a spacer around the connecting device prior to deformation of the connecting device such that deformation of the connecting device causes teeth of the spacer to dig into the rotor top.

12. A method according to claim 11 wherein the method further includes the step of inserting the motor shaft into an aperture provided in the connecting device such that the shaft engages with the connection device as an interference fit and rotational movement of the motor shaft with respect to the connecting device is substantially prevented.

\* \* \* \* \*